March 20, 1928.

F. L. STANTON 1,662,838

INTRA ORAL CASSETTE

Filed March 19, 1926

INVENTOR
FREDRICK L. STANTON
BY
ATTORNEY

Patented Mar. 20, 1928.

1,662,838

UNITED STATES PATENT OFFICE.

FREDERICK L. STANTON, OF NEW YORK, N. Y.

INTRA-ORAL CASSETTE.

Application filed March 19, 1926. Serial No. 95,857.

When it is desired to take an X-ray of a patient to determine whether or not his teeth are in occlusion, it is necessary to pass X-rays longitudinal of the teeth, or nearly so, and these X-rays must be applied from a position external to the patient, as below the lower jaw for the lower teeth and near the top of the nose and between the eyes for the upper teeth. In either event, it is necessary to have a cassette in the mouth of the patient which will hold a negative in proper relation to the teeth so that a suitable radiograph may be taken. The object of this invention is to provide a cassette suitable for this purpose. This object is accomplished by my invention, one embodiment of which is hereinafter more particularly set forth.

For a more detailed description of my invention, reference is to be had to the accompanying drawings, forming a part hereof, in which Figure 1 is a perspective view of the cassette intensifying screens and plate or film.

Throughout the various views of the drawings, similar reference characters designate similar parts.

Figure 1:
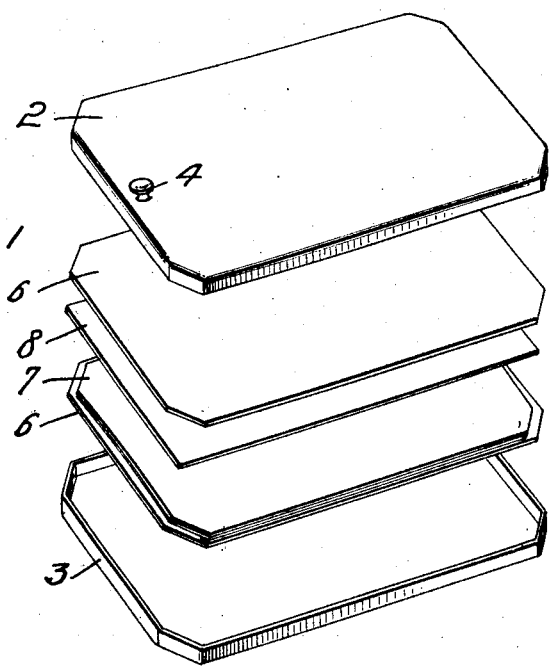
Figure 2:
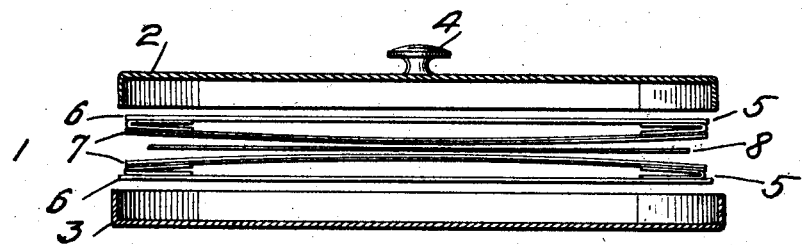
Figure 2 is a section of the cassette showing the parts separated.
Figure 3:
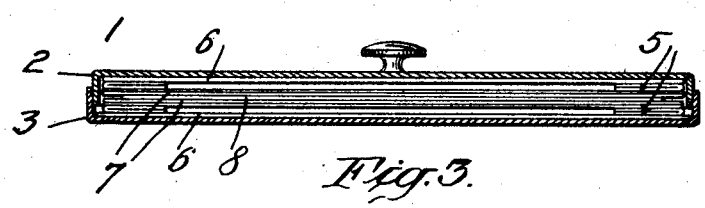
Figure 3 is a similar section of a closed cassette with the plate and intensifying screens therein.

As the cassette is placed in the mouth of a patient, it is absolutely necessary that it should be made in such a way that it can be easily and thoroughly cleaned and sterilized. Therefore, it is preferable to make it out of aluminum which is adaptable for this purpose as well as for other purposes of the device. The cassette 1 is composed of a cover 2 which fits snug in a bottom 3 and the two parts are composed of flanged plates shaped substantially as shown, so as to make an elongated thin box suitable for placement in the mouth of a patient, the dimensions being made accordingly, and the parts are made strong enough to withstand the bite of the patient who grips the cassette with his teeth when it is in use. The cover has a handle 4 at one end by which it may be easily manipulated. Fitting in the cassette are the intensifying screens 5 which are made in the usual way with plates of aluminum 6 and a suitable composition 7 placed thereon in the conventional manner. The intensifying screen that goes in the bottom 3 has the plate slightly larger than the corresponding plate that goes in the cover 2. This is for the purpose of preventing all slipping or movement of the film and plates when the apparatus is in use. Between the intensifying screens 5 is placed the plate or film 8 which is the negative that is acted upon by the X-rays and the illumination of the intensifying screens. The parts are assembled, as indicated in the figures, and the cassette is closed, as shown in Figure 3, and it may then be inserted in the mouth of a patient and an exposure taken either of the upper or lower jaw, as above set forth. After the exposure has been taken, the cassette may be taken into a dark room and opened, the intensifying screens may be removed and set aside, the plate or film may be developed in the usual manner and the cassette may be thoroughly cleansed and sterilized and dried and thereafter may be provided with the intensifying screens and the negative and again used as before.

While I have shown and described one embodiment of my invention, it is obvious that it is not restricted thereto, but that it is broad enough to cover all structures that come within the scope of the annexed claim.

Having thus described my invention, what I claim is:

In a device of the class described, a cassette composed of two flanged plates, one of which forms the top and the other the bottom, the two being shaped so as to fit snug one within the other and to be of a size suitable to be received in the mouth of a patient and between his teeth, intensifying screens composed of a plate with a composition thereon and each plate being made to fit in place, that is one being made to fit the cover and one being made to fit the bottom.

In testimony whereof, I have hereunto set my hand this 17th day of March, 1926.

FREDERICK L. STANTON.